INVENTOR.
RAYMOND A. REZNICEK
BY
Richard G. Geib
ATTORNEY

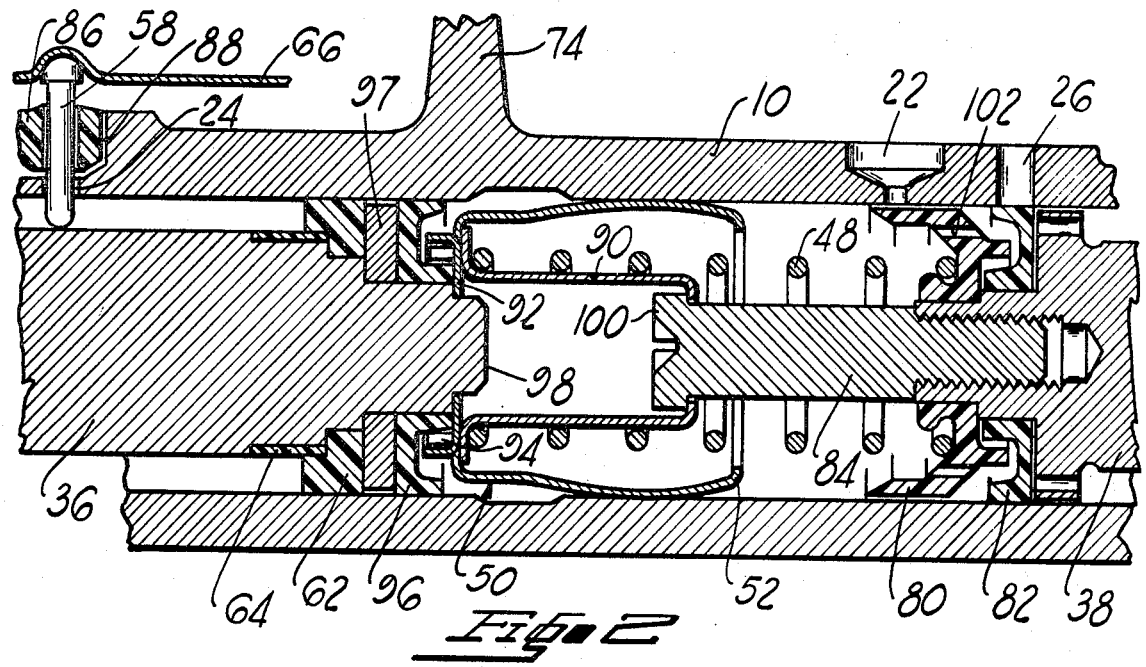
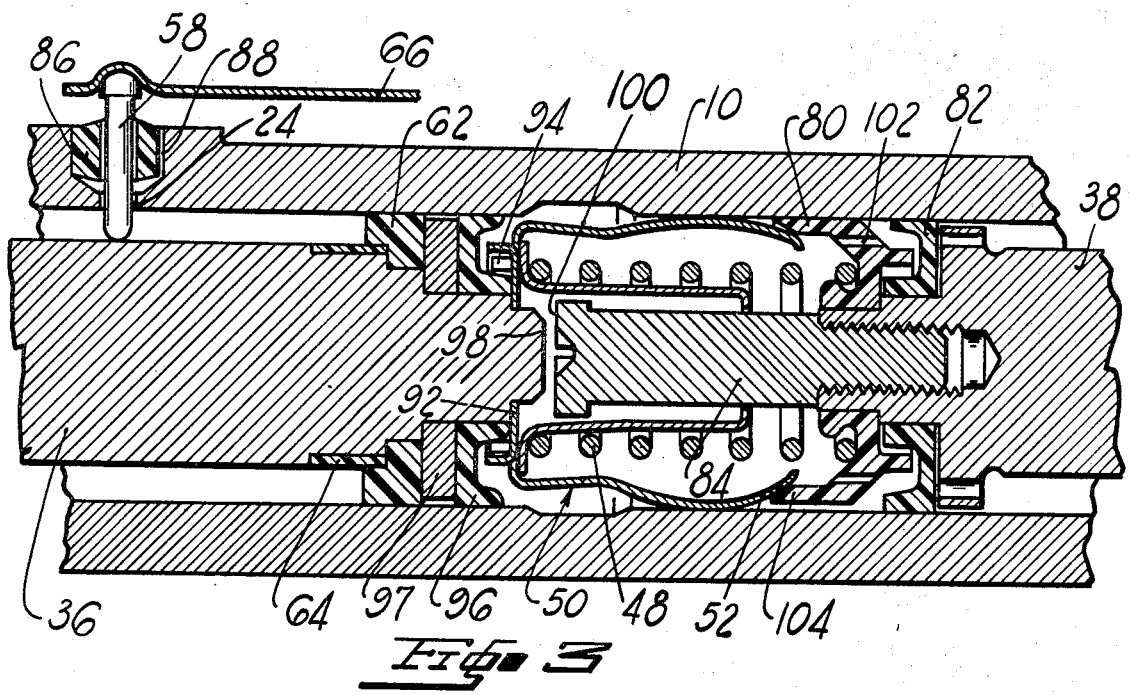

United States Patent Office 3,526,090
Patented Sept. 1, 1970

3,526,090
MASTER CYLINDER MALFUNCTION INDICATOR
Raymond A. Reznicek, St. Joseph, Mich., assignor to The Bendix Corporation, a corporation of Delaware
Filed Sept. 5, 1967, Ser. No. 665,581
Int. Cl. F15b 7/00, 7/08
U.S. Cl. 60—54.6          8 Claims

ABSTRACT OF THE DISCLOSURE

Warning signal switch means for a brake master cylinder utilizing a closed electrical circuit having in series a master cylinder secondary piston and a caged spring assembly operatively connected to the master cylinder primary piston and the master cylinder housing.

SUMMARY

With the advent of split system type master cylinders which provide fail-safe actuation of vehicular brakes, it has become apparent that the operator of the vehicle may not know of a malfunction in the brake system, for example, one of the separate hydraulic systems provided by a split system master cylinder fails to develop sufficient pressure for the actuation of one portion of the brake systems. It is, therefore, a principal object of this invention to provide an indicating means for a split system brake master cylinder which will readily provide an operator thereof with an indication of a malfunction in the development of pressures in the separate pressure developing chambers of the master cylinder.

It is another object of this invention to provide an indicator means, as aforementioned, integrated within the split system type master cylinder a simple, practical and economical manner which will warn the operator of the master cylinder of abnormal travel of the piston means within the master cylinder both with respect to the housing and with respect to each other.

It is yet a more detailed object of this invention to provide an indicator of an electrical type which is sensitive to the travel of the secondary piston within the master cylinder and the relative motion between the secondary and primary pistons within the master cylinder such that abnormal travel of either type will open the structural connection of the electrical circuit and interpose a fluid in the connection that will increase the resistance in the system to activate the device energizing the warning means, e.g., a light or buzzer within the operator's compartment of the vehicle.

DRAWING DESCRIPTION

Other objects and advantages will appear from the following description of the drawings in which:

FIG. 2 is a broken cross sectional enlarged illustration of the secondary and primary pistons within the master cylinder and the electrical connections for maintaining a normally closed electrical circuit therethrough in the released attitude of the secondary and primary pistons;

FIG. 3 is a similarly broken and enlarged section of the elements within the master cylinder as seen in FIG. 2 showing the primary piston having travelled an abnormal amount whereby the circuit has been broken;

DETAILED DESCRIPTION

Figure 1:
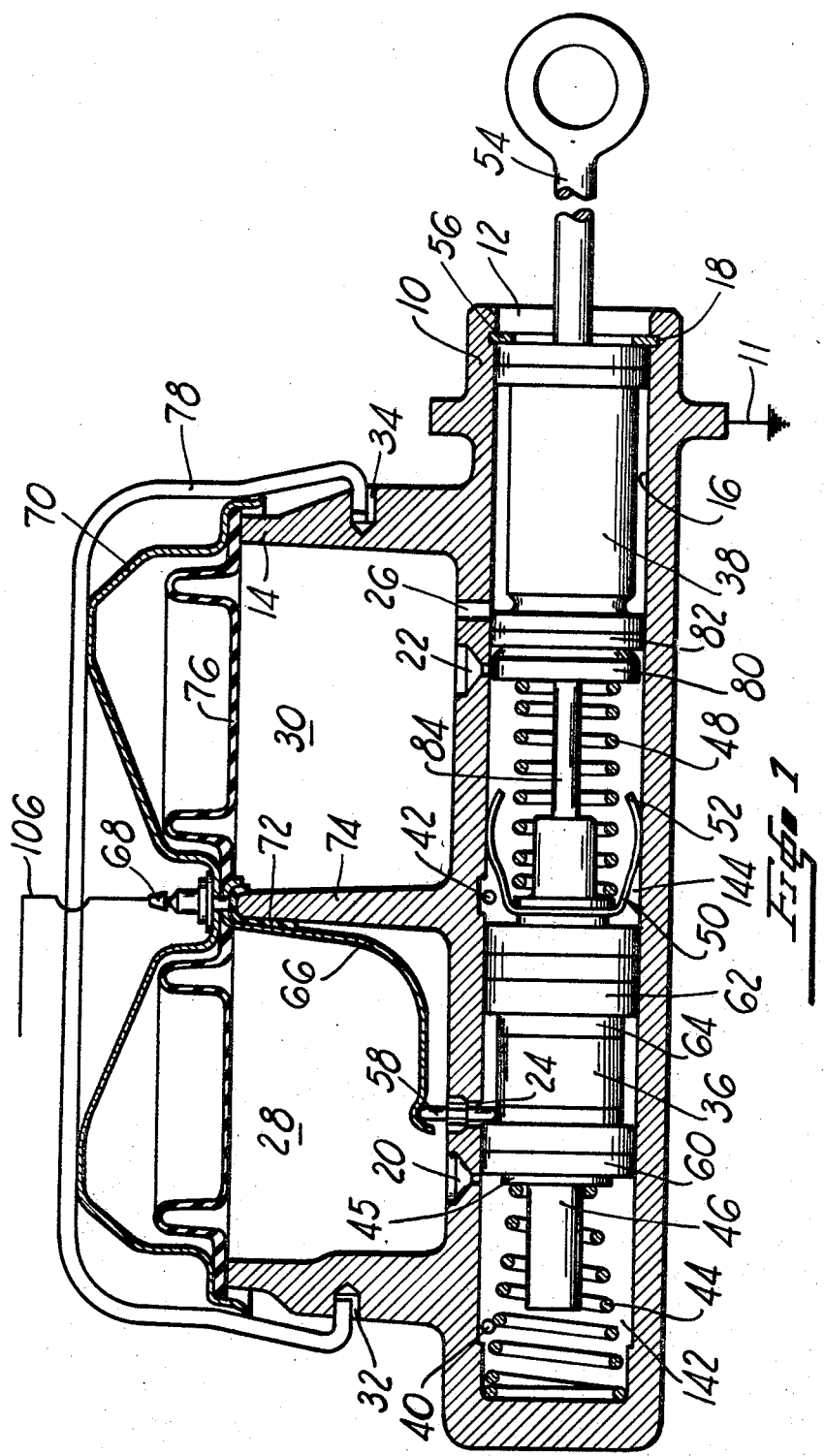
FIG. 1 is a cross sectional illustration of a split system type master cylinder incorporating structural elements which provide a closed electrical connection in accordance with the principles of my invention.

With more particular regard to FIG. 1, there is shown a master cylinder housing 10 which, as will be familiar to those skilled in the art to which this invention relates, is adaptable to be mounted upon a firewall of an automobile or upon a shell of a power servomotor that is in turn connected to the firewall of the automobile for operation by a brake pedal within the operator's compartment. This mounting of the master cylinder housing to the vehicle structure provides a ground connection 11 for the housing.

The housing may be formed by any number of methods, such as by casting, to have an internal open ended bore 12 and a reservoir housing 14. After formation, the housing is then machined to have smooth sidewalls 16, a retainer groove 18, fluid return ports 20 and 22 and fluid filling ports 24 and 26. More particularly, the ports are drilled through the walls of the bore 12 to communicate reservoir chambers 28 and 30 to the bore 12. Also the housing is machined as at 32 and 34 on opposite ends of the reservoir housing 14 for purposes that will appear hereinafter. The final machining operation prior to the assembly of secondary pistons 36 and primary piston 38 involves the drilling and tapping of outlet ports 40 and 42 through the housing 10 into the bore 12 at spaced intervals, as shown. As may be appreciated by those skilled in the art, the machining of the smooth surfaces 16 for the bore 12 is the last step in the operation after the drilling of the aforementioned ports 40 and 42.

To assemble the secondary piston 36 and primary piston 38 within the bore, the piston 36 and its return spring 44 are first placed within the bore. The secondary piston 36 has a forwardly projecting extension 46 over which a plastic retainer 45 and the return spring 44 are assembled. The plastic retainer 45 insulates piston 36 from the spring bearing on housing 10 when assembled. Next the primary piston 38 with its caged spring 48 is placed within the bore until the retainer 50 having trailing fingers 52 abuts the rearmost face of the secondary piston 36. The primary piston 38 has joined to it a push rod 54, as by means familiar to those skilled in the art, and pressure is applied to the push rod 54 to compress the return spring 44 and the cage spring 48 until snap ring 56 can be fitted within the groove 18 whereupon the assembly of the pistons 36 and 38 within the bore 12 is complete.

The next step is to introduce an electrical connector 58 that is guided by the sidwalls of the filling port 24 between the reservoir 28 and the bore 12 to rest upon the peripheral walls of the secondary piston 36 between its forward facing seal 60 and its forward facing secondary seal 62 to be normally spaced from an insulating ring 64 adjacent the forward facing secondary seal 62. An arm 66 connected to a terminal 68 of a master cylinder cap 70, which overlies an insulator 72 on the partition 74 between the reservoir chambers 28 and 30 maintains the contact 58 against the peripheral surface of the secondary piston 36 aforementioned. The cap 70 and its sealing diaphragm 76 are assembled to the reservoir housing 14 by means of a spring clip 78 having ears fitting within the drilled portions 32 and 34 of the master cylinder reservoir housing 14.

It should be noted that the primary piston 38 is fitted with a plastic spring retainer 80 which also serves to locate secondary seal 82 on the forward face of the primary piston 38, as well as provide the bearing surface for the cage spring 48 that is loaded by means of cage bolt 84, for example. This detail can be more readily observed by looking to FIG. 2 showing these elements in cross section. As may be readily seen in this figure, the connector 58 is insulated from the housing 10 as it passes through the filler port 24 by an insulator 86 having a plurality of grooves 88 in its sides between it and the sides of the housing 10 about the filler port 24. Furthermore, the spring retainer 50 is constructed from sheet metal pieces 90 and 92 with the piece 90 forming a top-hat retainer for the spring 48 and the piece 92 being formed to provide the trailing fingers 52 as well as forwardly projecting ears 94 for retaining the rearwardly facing seal 96 against a seal back-up ring 97 on the secondary piston 36 which is between the forwardly facing secondary seal 62 and the seal 96 thereof. Upon assembly the sheet metal piece 92 fits over a rearwardly extending projection 98 of the secondary piston 36 that also acts as a stop for the head 100 of the caging bolt 84. Also the plastic spring retainer 80 is provided with a plurality of passages 102 to prevent fluid entrapment.

Figure 4:
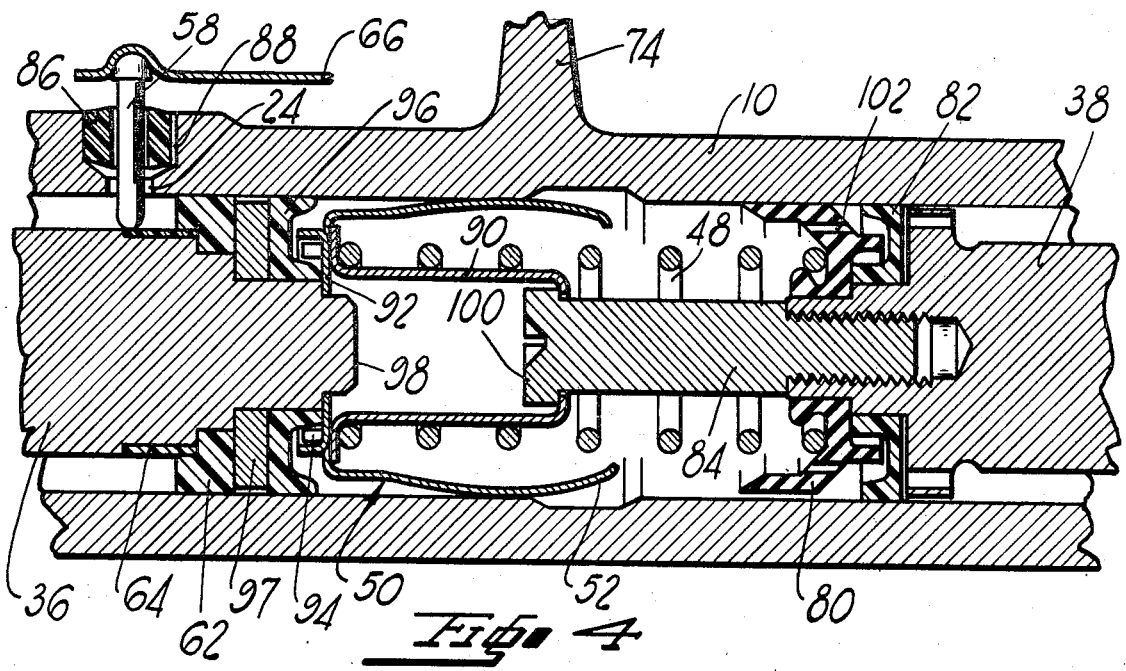
FIG. 4 is also an enlarged cross sectional view of the elements as seen in FIGS. 2 and 3 showing the secondary piston having had travelled an abnormal amount to open the structurally connected circuit through the master cylinder.

Whereas FIGS. 3 and 4 do not add anything different to the description of the construction of the master cylinder in accordance with the prinpicples of this invention, they are illustrative of the operation of the device. More particularly, FIG. 3 shows the attitude of the internal elements whenever abnormal travel between the secondary piston 36 and the primary piston 38 has occurred whereupon the plastic spring retainer 80 is moved so that its forwardly projecting ring 104 biases the trailing fingers 52 away from the smooth surfaces 16 of the bore 12 of the master cylinder housing 10 to open the circuit to the ground 11. In FIG. 4 the secondary piston 36 has travelled an abnormal amount so that the electrical connecting pin 58 overlies the insulating ring 64 adjacent the forwardly facing secondary seal 62 of the secondary piston 36 to open the circuit via the master cylinder housing to the ground 11.

Figure 5:
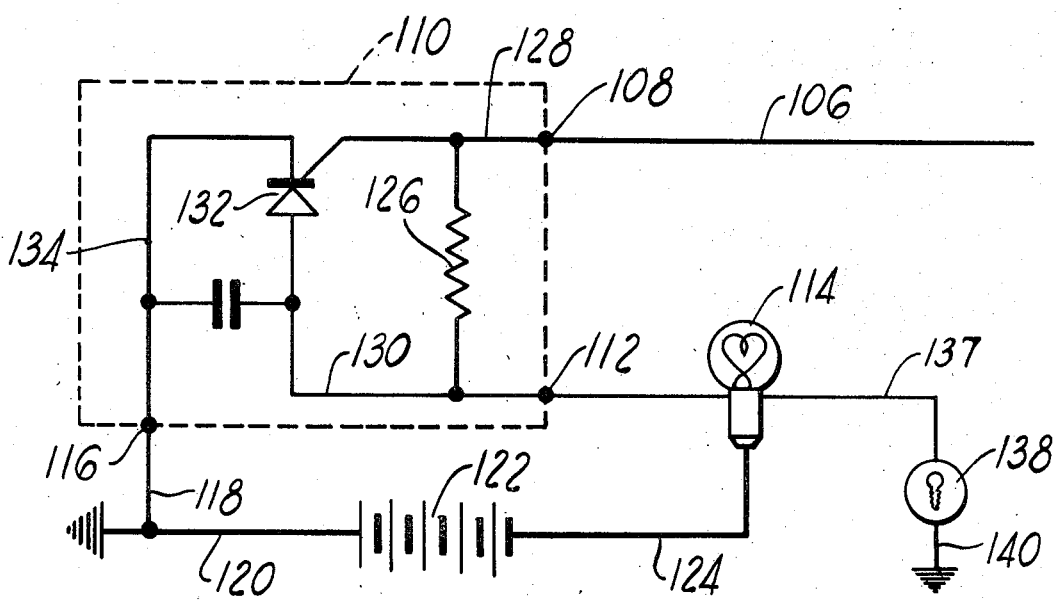
FIG. 5 is a schematic illustration of an electrical circuit showing the actuating mechanisms and the indicating device to be controlled thereby.

Upon assembly of the master cylinder housing 10 within the vehicle, an electrical lead 106 (see FIGS. 1 and 5) is connected to the external terminal 68 on the cap 70; and to a terminal 108 of a control box 110. The control box is also provided with a terminal 112 leading to the ground side of an indicator light 114, and a terminal 116 connected by means of a lead 118 to the ground lead 120 of a storage battery 122, which is connected by means of lead 124 to the positive side of the warning light 114. Within the control box, there is a resistor 126 that is connected between leads 128 and 130 from the terminals 108 and 112, respectively. The lead 128 is also connected to the gate of a silicon diode rectifier 132; whereas the lead 130 is connected to the cathode of the rectifier 132. To complete the electrical circuitry within the control box 110, a lead 134 connects the ground terminal 116 with the anode of the rectifier 132 and a condenser 136 is operatively interposed between the lead 134 and the lead 130 to eliminate electrical surges as the electrical circuit is closed down to thereby prevent the inadvertent operation of the silicone diode rectifier 132 at such times thereby preventing the inadvertence or tricking the operation of the warning light 114 when it is not desired.

Preferably, in order to maintain repeated testing of the warning light 114, a lead 137 leading from an ignition switch 138 having a ground connection 140 that is energized whenever the engine of the vehicle is started, is connected to the ground side of the warning light 114.

OPERATION

In operation, it is expected that those skilled in the art to which this invention relates will understand that during normal operation of the unit a force upon the push rod 54, as will be caused by the operator of the vehicle depressing a brake pedal (not shown), will cause the primary piston 38 to move inwardly of the bore 12, and, as the cage spring 48 will be stronger than the return spring 44, this movement will first be transmitted directly to the secondary piston 36 to immediately begin pressurization of chamber 50. As soon as pressure begins to develop in the chamber 50, the combined effect of this pressure and the force of the spring 44 in a compressed attitude will cause the relative motion of the primary piston 38 to immediately begin pressurization of chamber 142. As soon as pressure begins to develop in chamber 142, the combined effect of this pressure and the force of spring 44 in the compressed attitude will cause the relative motion of the primary piston 38 with respect to the secondary piston 36 to also begin pressurization of the chamber 144 therebetween whereby pressurized fluid is delivered from both outlets 40 and 42. As will be realized again by those skilled in the art, the pressures in the chambers 142 and 144 will not be developed until the lip of the seals 16 and 82, respectively, pass by the return ports 20 and 22 to close the chambers 142 and 144.

During this normal operation, the travel of both the secondary piston 36 and the primary piston 38 will not be sufficient to respectively cause the pin 58 to overlie the insulator ring 64 nor the engagement of the ring 104 of the plastic spring retainer 80 and the trailing fingers 52 of the cage spring retainer 50.

Thus, the 12 volt potential from the storage battery 122 will be available to the positive side of the warning light 114; whereas due to the combined resistance of the rectifier 132 and the resistor 126 in the control box 110 there will only be about .004 ampere flow of current to the negative side of the light 114. Thus, the light 136 will not operate even though the circuit is closed because of the high resistances.

However, in the event that the secondary piston travels abnormally, which would indicate a failure in the brake system ahead of the port 40, the pin 58 will overlie the insulator ring or sleeve 64 so as to open the structural elements connecting the control box to the ground 11 and interpose a fluid medium in this connection whereby the ignition anode of the rectifier 132 will fire to connect the leads 134 and 130 whereby the light 114 is activated to indicate a failure.

In the event of a failure in the primary chamber 144 or in the mechanism ahead of the discharge port 42, the primary piston 38 will travel abnormally within the chamber 144 to engage the ring 104 with the trailing fingers 52 to also open the structurally connected circuit from the lead 106 to the ground 11 again interposing the fluid within the master cylinder in this circuit to increase the resistance and fire the rectifier as aforementioned to actuate the light 114.

If there has been a failure, the turning off of the ignition switch 138 resets the rectifier 132, and, as aforementioned, the condenser 136 prevents the tricking of the rectifier 132 whenever the electrical load surges in the vehicle electrical system, as would be caused by the turn off of the ignition switch 38 or in other situations as is readily apparent to those skilled in the art.

Having described an operative construction of my invention, it is now desired to set forth in intended protection sought by these Letters Patent as follows:

I claim:

1. For a split master cylinder a warning mechanism for providing an indication of overtravel of piston means within said master cylinder as well as abnormal relative motion between the piston means and the master cylinder, said warning mechanism comprising:

a means to provide a normally closed ground connection through the piston means of said master cylinder, which means includes a spring finger electrically connecting the piston means within the master cylinder to the housing of the master cylinder and an actuator operably connected to a portion of the piston means that is arranged to break the contact of the spring finger between the piston means and the housing upon abnormal relative motion between the portions of the piston means, and an electrical contact means operably connected to another portion of the piston means to provide an external terminal on the master cylinder, said another portion of the piston means being provided with an insulating ring which will underlie the electrical contact whenever the another portion of the piston means travels an excessive amount so that whenever said spring fingers or said contact means opens the structurally closed circuit the fluid within the master cylinder is utilized to complete the circuit and thereby provide increased resistance within the circuit;

an electrical mechanism connected to the external terminal, said mechanism including a device operated by increased resistance to provide a non-resistant current path, said mechanism having a condenser to prevent tricking of said device by surging current; and an indicator connected to said electrical mechanism to be operated thereby whenever increased resistance is created in said master cylinder to trigger said device.

2. A master cylinder and normally closed electrical warning system to prevent electrolytic effect within said master cylinder, said system comprising:

a master cylinder housing having a reservoir cavity and a fluid pressurizing bore in fluid communication;

spring biased first and second movable walls in said bore controlling the fluid communication from said reservoir to close same when it is desired to build separate hydraulic pressures in said bore including a caged spring assembly having trailing spring fingers operatively connecting said first and second movable walls electrically to the master cylinder housing;

a spring biased electrical contact for the forwardmost of said first and second movable walls in said bore of said master cylinder housing operatively connecting said forwardmost of said first and second movable walls to an external electrical terminal of said master cylinder housing with said forwardmost of said first and second movable walls having an insulating ring adjacent the rearwardmost face of same which upon underlying said electrical contact interrupts the structurally closed electrical circuit from said terminal through said housing;

a switch actuator operatively connected to the rearwardmost of said first and second movable walls and arranged within said bore so as to be operatively interposed between said trailing spring fingers of said caged spring assembly and said housing to interrupt the structurally closed circuit between said external terminal and said housing whenever said rearwardmost of said first and second movable walls moves an abnormal amount relative to the forwardmost of said first and second movable walls; and an electrical mechanism connected to a power supply and said external terminal, said mechanism having a device sensitive to resistance in said master cylinder for completing a non-resistant electrical circuit whenever the structural connection via said master cylinder housing is broken so as to utilize the fluid within said bore as a means to complete the electrical circuit.

3. In a master cylinder:

a housing defining a bore therewithin;

a primary piston slidable in said bore;

a secondary piston slidable in said bore operatively connected to said primary piston for movement therewithin under normal conditions of operation but relative thereto under abnormal conditions;

switch means carried by said pistons for controlling a warning device;

said switch means including first means carried by one of said pistons and engaging the wall of said bore, and second means carried by the other piston for forcing said first means away from the wall of the bore upon abnormal relative movement between the pistons to thereby actuate said warning device.

4. The invention of claim 1: said first means including resilient fingers extending from said one piston to the wall of the bore.

5. The invention of claim 1:

said first means including resilient fingers extending from said one piston to the wall of the bore;

said other piston forcing said second means between said fingers and the wall of the bore upon said abnormal relative movement, whereby said second means drives the fingers away from the wall of the bore to actuate said warning device.

6. The invention of claim 5:

said second means being an insulating ring;

said ring having an outer circumferential surface carried adjacent the wall of the bore;

said other piston forcing said ring between said fingers and the wall of the bore upon said abnormal relative movement between said pistons.

7. The invention of claim 6: the forward edge of said ring being wedge-shaped to facilitate entry of the latter between said fingers and the wall of the bore.

8. The invention of claim 5: said one piston being said secondary piston, the other piston being said primary piston.

References Cited

UNITED STATES PATENTS

| | | |
|---|---|---|
| 3,393,514 | 7/1968 | Cripe. |
| 3,412,556 | 11/1968 | Rike et al. |
| 3,412,557 | 11/1968 | Williams. |
| 3,421,322 | 1/1969 | Reznicek. |
| 3,448,579 | 6/1969 | Reznicek. |

MARTIN P. SCHWADRON, Primary Examiner

R. R. BUNEVICH, Assistant Examiner

U.S. Cl. X.R.

188—151, 152; 303—84

UNITED STATES PATENT OFFICE
CERTIFICATE OF CORRECTION

Patent No. 3,526,090      Dated September 1, 1970

Inventor(s) Raymond A. Reznicek

It is certified that error appears in the above-identified patent and that said Letters Patent are hereby corrected as shown below:

Column 3, line 21, change "prinpicples" to ---principles---.

Column 6, line 19, "claim 1" should read ---claim 3---; line 22, "claim 1" should read ---claim 3---.

SIGNED AND
SEALED
JAN 19 1971

(SEAL)
Attest:

Edward M. Fletcher, Jr.
Attesting Officer

WILLIAM E. SCHUYLER, JR.
Commissioner of Patents